United States Patent Office 2,729,608
Patented Jan. 3, 1956

2,729,608

COMPOSITE ELASTOMERS CONTAINING CHLOROSULFONATED POLYMERS OF ETHYLENE

Daniel E. Strain, Wilmington, Del., assignor to E. I. du Pont de Nemours and Company, Wilmington, Del., a corporation of Delaware No Drawing. Application May 10, 1951,
Serial No. 225,678

10 Claims. (Cl. 260—4)

This invention relates to a product compounded from a mixture of halosulfonated hydrocarbon polymers and chemically unsaturated elastomers, either natural or synthetic, and is more particularly related to oxygen and ozone resistant elastomer-chlorosulfonated hydrocarbon polymer blends.

Most commercial elastomers are chemically unsaturated. Perhaps one of the outstanding faults which limits the utility of these elastomers, either natural or synthetic, is their inability to withstand, for any extended periods of time, the harmful action of oxygen and especially ozone. Poor durability, due to ozone cracking and oxidative degradation, is a direct result. Efforts over the years have been directed, with no outstanding success, toward improving compositions having suitable elastic properties in order that they may resist, for a satisfactory period of time, the action of those gases in particular, and chemical oxidation in general. In recent years synthetic elastomers have been developed having various properties and among them is included a class of elastomers produced from the treatment, with the halogens and sulfur dioxide, of tough normally solid hydrocarbon polymers. The McQueen et al. Patent 2,212,786, of August 27, 1940, described such a process for the preparation of the chlorosulfonated olefin polymers and especially the chlorosulfonated products from the normally solid polymers of ethylene. These products, and similar products, have been vulcanized or cured by a process similar to that used for the curing of rubber, such processes being described in U. S. Patents to McAlevy et al., 2,416,060; 2,416,061 and others.

Consideration of the prior art has revealed no expressed or implied suggestion that from the halosulfonated hydrocarbon polymers and elastomers of like nature, in conjunction with natural and other synthetic rubbers, durable elastomeric products could be produced resistant to attack by ozone, oxygen or oxidizing agents.

An object of the present invention is to provide improved elastomers of superior durability. Another object is to provide a process for the preparation of homogeneous mixtures of the halosulfonated high molecular weight hydrocarbon polymers with other elastomeric compounds. Yet another object is to provide elastomers highly resistant to the action of oxygen, ozone and oxidizing agents. Still another object is to provide compounded mixtures of elastomers with the chlorosulfonated normally solid polymers of ethylene. Other objects and advantages of the invention will hereinafter appear.

The above objects are realized, inter alia, in accord with the invention by the preparation of a homogeneous blend of one or more unsaturated elastomers and a synthetic-elastomer-type of compound as exemplified by the chlorosulfonated normally solid polymers of ethylene. It has been found that when such a homogeneous composition has been prepared from a mixture of such products, an elastomer results that is remarkably resistant to deterioration and especially from the action of oxygen and ozone. The surprising influence of the chlorosulfonated type of elastomer on unsaturated elastomers is evident in the appearance of a critical concentration of the chlorosulfonated type of elastomer above which blends with other elastomers are essentialy inert against attack by ozone, oxygen or oxidizing agents, in spite of the fact that such a critical concentration may represent a minor portion of the total elastomers in the blend.

The examples which follow illustrate preferred embodiments of the invention in which parts are by weight unless otherwise indicated.

Blends of the following compositions were prepared.

*Example I.—Blends with Neoprene*

[Parts by weight]

| X | | Y | |
|---|---|---|---|
| A | 100 | Neoprene Type W | 100 |
| "Staybelite" | 2.5 | MgO | 4.0 |
| "Tri-Mal" | 33 | "Neozone" A | 2.0 |
| "Captax" | 3 | Stearic acid | 0.5 |
| | | Zinc oxide | 5.0 |
| | | "NA-22" | 0.5 |
| Elastomer content, percent by volume | 90 | Elastomer content, percent by volume | 94 |

*Properties.*—The addition of 10 to 50 per cent A to neoprene type W resulted in the following property changes, increased modulus, compression set, and oil absorption, decreased elongation and lower brittleness temperature. An unexpected improvement in extension fatigue cracking was observed in a 50/50 blend of A and neoprene.

*Example II.—Blends with natural rubber*

[Parts by weight]

| X | | Y | |
|---|---|---|---|
| A | 100 | Smoked sheet | 100 |
| "Staybelite" | 2.5 | Stearic acid | 1 |
| "Tri-Mal" | 37.5 | Age Rite Hipar | 1 |
| "Captax" | 3 | Zinc oxide | 5 |
| Diphenyl guanidine | .25 | "Captax" | 1 |
| | | Sulfur | 3 |
| Elastomer content, percent by volume | 89.5 | Elastomer content, percent by volume | 95 |

*Properties.*— The addition of 10 to 50 per cent A to natural rubber smoked sheet caused an improvement in abrasion resistance. Other property changes were lower elongation, increased modulus and hardness, a slight improvement in compression set, decreased oil absorption and a degradation of electrical properties.

*Example III.—Blends with GR-S*

[Parts by weight]

| X | | Y | |
|---|---|---|---|
| A | 100 | GR-S | 100 |
| Stearic acid | 0.75 | Stearic acid | 1.5 |
| EPC black | 24 | EPC black | 40 |
| "Captax" | 3 | "Captax" | 3 |
| "Tri-Mal" | 37.5 | Zinc oxide | 5 |
| Diphenyl guanidine | 0.25 | Sulfur | 2 |
| "Staybelite" | 2.5 | | |
| Elastomer content, percent by volume | 79 | Elastomer content, percent by volume | 79 |

*Properties.*—A at 10 to 50 per cent in GR-S caused a proportionate improvement in water, oil, and abrasion resistance, and in resistance to oven aging. There was also an increase in modulus together with a decrease in elongation.

*Example IV.—Blends with "Hycar" OR-15*

[Parts by weight]

| X | | Y | |
|---|---|---|---|
| A | 100 | "Hycar" OR-15 | 100 |
| Stearic acid | 1 | Stearic acid | 1 |
| EPC black | 40 | EPC black | 40 |
| "Staybelite" | 25 | Dibutyl phthalate | 15 |
| "Tri-Mal" | 37.5 | Zinc oxide | 5 |
| "Captax" | 3 | Sulfur | 1.5 |
| | | MBTS | 1.5 |
| Elastomer content, percent by volume | 72.7 | Elastomer content, percent by volume | 71 |

*Properties.*—At a level of 10 per cent A caused an improvement in the compression set of "Hycar" OR-15, together with drop in stiffness. Some improvement in oven aging was also noted. However, the outstanding oil resistance of "Hycar" OR-15 was lowered by the addition of A at 10 to 50 per cent. Modulus and hardness were increased, and elongation was lowered.

*Example V.—Blends with GR-I (Butyl)*

[Parts by weight]

| X | | Y | |
|---|---|---|---|
| A | 100 | GR-I | 100 |
| Stearic acid | 1.5 | Stearic acid | 3 |
| EPC black | 24 | EPC black | 40 |
| "Staybelite" | 2.5 | Zinc oxide | 5 |
| "Tri-Mal" | 37.5 | Sulfur | 2 |
| "Captax" | 3.0 | Methyl "Tuads" | 1 |
| | | "Captax" | 0.5 |
| Elastomer content, percent by volume | 79 | Elastomer content, percent by volume | 79 |

*Properties.*—The addition of 10 to 50 per cent A to GR-I caused a loss of tensile strength and elongation, together with an increase in modulus, hardness, and compression set. On the other hand, there was a marked improvement in abrasion resistance.

*Ingredient code:*

| | |
|---|---|
| "Staybelite" | Hydrogenated rosin |
| "Tri-Mal" | Tribasic lead maleate. |
| "Captax" | Mercaptobenzothiazone. |
| "Neozone" A | Phenyl-alpha-naphthylamine. |
| EPC black | "Continental" AA, an easy processing carbon black. |
| NA-22 | 2 mercaptoimidazoline. |
| GR-S | Butadiene-styrene copolymer. |
| "Hycar" OR-15 | An oil resistant butadiene acrylonitrile copolymer. |
| GR-I | A substantially saturated elastomer. |
| A | A chlorosulfonated solid polymer of ethylene containing 26% to 29% chlorine and 1% to 3% sulfur. |
| MBTS | Benzothiazyl disulfide. |
| Age Rite Hipar | R. T. Vanderbilt antioxidant. |

The compounding of the above elastomers was conducted separately, that is in Example I, for example, A and the compounding ingredients were worked on a two-roll 8" by 16" mill according to accepted rubber milling procedures. The neoprene elastomer, with its compounding ingredients, was separately and similarly worked. Thereafter the compounded stocks, X and Y, were then blended on the same mill. The proportions of the stocks in each blend were adjusted to give (a) 90 volumes of A; 10 volumes of neoprene type W, (b) 50 volumes of A; 50 volumes of neoprene type W and (c) 10 volumes of A; 90 volumes of neoprene type W. The blends described in the table and referred to under "Properties" supra were similarly prepared.

The blends were cured in standard A. S. T. M. compression molds according to the accepted procedure of D 15-41. All blends were then cured for 30 minutes at 320° F. except Example I which was cured for 50 minutes at 292° F. The specimens for tests were prepared with dimensions of 0.5" x 3" x .075" and were, prior to testing, bent around a mandrel 5/16" in diameter and stapled in that position. A specimen was then exposed to a high ozone concentration and results given in Table I obtained.

TABLE

A/Foreign Elastomer

| | 100/0 | 90/10 | 50/50 | 10/90 | 0/100 |
|---|---|---|---|---|---|
| Neoprene Type W | Excel | Excel | Excel | Crazed | Crazed. |
| Exposure Time | 14 hrs | 14 hrs | 14 hrs | 20 min | 20 min. |
| Natural Rubber | Excel | Excel | Excel | Cracked | Cracked. |
| Exposure Time | 14 hrs | 14 hrs | 14 hrs | 4 min | 4 min. |
| GR-S | Excel | Excel | Excel | Cracked | Cracked. |
| Exposure Time | 14 hrs | 14 hrs | 14 hrs | 5 min | 5 min. |
| "Hycar" OR-15 | Excel | Excel | One edge split, otherwise excel. | Cracked | Cracked. |
| Exposure time | 14 hrs | 14 hrs | 4 hrs | 5 min | 5 min. |
| GR-I (Butyl) | Excel | Excel | Excel | Few cracks | Few cracks. |
| Exposure time | 14 hrs | 14 hrs | 14 hrs | 14 hrs | 14 hrs |

As illustrated by the examples, any suitable method of mixing the unsaturated type of elastomers with the chlorosulfonated type of elastomer may be used, such as is provided by rubber working rolls, Banbury mixers, dispersion or solution blenders and the like. Highly stable products may be produced by these and analogous methods known to those skilled in the art of rubber processing; there may be added to the compounding rolls, mixers or other suitable working or kneading apparatus, suitable proportions of uncured, unsaturated elastomers and uncured chlorosulfonated-type-elastomers together with suitable vulcanizing agents, the curing of the elastomers in the mixture being accomplished subsequent to the mixing operation.

The unsaturated elastomers that may be used for producing the highly resistant compositions of this invention include natural rubber, isomerized rubber, polychloroprene, the synthetic rubbers produced in accord with the hot or cold processes from polymers of butadiene alone or copolymers of butadiene with acrylonitrile, styrene, the isoolefins and the like.

The chlorosulfonated type of elastomers that may be employed include substituted hydrocarbon and oxygenated hydrocarbon polymers equivalent to the chlorosulfonated solid polymers of ethylene described in the aforesaid McAlev et al. patents. These elastomers include, more specifically, the substituted polymers produced by the reaction of hydrocarbon polymers with chlorine and sulfur dioxide and their equivalents. The invention includes these equivalents of the chlorosulfonated type of hydrocarbons, viz. products having elastomeric and curing properties, the elastomeric properties being imparted to hydrocarbon polymers by halogen, hydrocarbon and acyloxy groups; the curing properties being imparted to the hydrocarbons by the presence of, in addition to the sulphonating groups provided by sulfur dioxide, phosphonating, carboxylating, chlorosulfonating, chlorophosphonating, chlorocarboxylating and agents that give hydrogen sulfide groups. Methods for producing such chlorosulfonated-type-elastomers are described in the aforesaid patents. The hydrocarbons that can be so substituted include, for example, solid to semi-solid tough hydrocarbon compounds and, more particularly, polymeric compounds. The solid to semi-solid polymers of ethylene are the preferred embodiments of the hydrocarbon to be substituted by the chlorosulfonyl or equivalent groups, although olefin polymers, other than ethylene polymers, may be used, such, for example, as polymers of propylene and isobutylene. Other hydrocarbon compounds which are suitable include the polymers and interpolymers of ethylene with monovinyl substituted saturated hydrocarbons, e. g. propylene, isobutylene, amylene, styrene; esters of the unsaturated monocarboxylic acids and derivatives thereof, such as acrylic and methacrylic acids, vinyl esters, e. g. vinyl acetate, vinyl chloride, vinyl chloroacetate and the like; products from the hydrogenation of polymers from monomers containing more than one double bond, e. g. isoprene, chloroprene, cyanoprene, divinyl acetylene and butadiene and interpolymers of such with styrene, acrylic acid and methacrylic acid, esters and the like. The hydrocarbons that produce superior products, it has been found, are those which prior to treatment with chlorine and sulfur dioxide are semi-solid to tough polymers.

In the preparation of blends containing the chlorosulfonated-type-elastomers and the unsaturated elastomers, there are also present compounding agents, in prescribed amounts, to provide the desired characteristics. Such agents are well known in the art and in this invention they are used in conformity with the teachings of the art.

The ratio of unsaturated elastomers to the chlorosulfonated-type-elastomers may vary through wide limits although it has been found that excellent resistance to oxygen, ozone and oxidizing agents can be provided by the presence in the blend of elastomers of more than a critical amount of the chlorosulfonated type of elastomer, i. e. more than 10% and preferably between 20 and 50% by volume of the chlorosulfonated elastomer without compounding agents.

The polymeric elastomers produced in accord with the process of this invention are, because of their unusual properties, especially useful in a wide variety of applications requiring outdoor durability, where elastomers frequently fail by ozone cracking. Moreover, the compositions are useful in industrial applications in which ozone, oxygen or oxidizing agents are encountered. The elastomers, accordingly, are of value for use in manufacturing such products as tires, hose, belting, rolls, footwear and the like; for the coating of fabrics, electric wires, cables and the like and insulation of electronic devices, especially for outdoor service. These products may likewise be used for the preparation of tubing, gaskets, washers, grommets, and like products, whether vulcanized to products having highly elastic or substantially solid non-elastic properties. Other important uses include the manufacture of adhesives, weather-stripping, floor pads, floor covering, finishes, paints and inks.

I claim:

1. A composition of matter, highly resistant to deterioration by the action of oxygen, ozone and oxidizing agents, comprising a homogeneous mixture of a chlorosulfonated normally solid polymer of ethylene and an unsaturated elastomer of the group consisting of natural rubber, isomerized rubber, polychloroprene, polymers of butadiene alone, copolymers of butadiene with acrylonitrile, copolymers of buetadiene with styrene and copolymers of butadiene with iso-olefins, the chlorosulfonated normally solid polymer of ethylene constituting from about 20% to about 50% by volume of the elastomer in the composition.

2. A composition of matter, highly resistant to deterioration by the action of oxygen, ozone and oxidizing agents, comprising a homogeneous mixture of a chlorosulfonated normally solid polymer of ethylene and natural rubber, the chlorosulfonated normally solid polymer of ethylene constituting from about 20% to about 50% by volume of the elastomer in the composition.

3. A composition of matter, highly resistant to deterioration by the action of oxygen, ozone and oxidizing agents, comprising a homogeneous mixture of a chlorosulfonated normally solid polymer of ethylene and an unsaturated polychloroprene elastomer, the chlorosulfonated normally solid polymer of ethylene constituting from about 20% to about 50% by volume of the elastomer in the composition.

4. A composition of matter, highly resistant to deterioration by the action of oxygen, ozone and oxidizing agents, comprising a homogeneous mixture of a chlorosulfonated normally solid polymer of ethylene and an unsaturated elastomer which is a copolymer of butadiene with styrene, the chlorosulfonated normally solid polymer of ethylene constituting from about 20% to about 50% by volume of the elastomer in the composition.

5. A composition of matter, highly resistant to deterioration by the action of oxygen, ozone and oxidizing agents, comprising a homogeneous mixture of a chlorosulfonated normally solid polymer of ethylene and an unsaturated elastomer which is a copolymer of butadiene with acrylonitrile, the chlorosulfonated normally solid polymer of ethylene constituting from about 20% to about 50% by volume of the elastomer in the composition.

6. A composition of matter, highly resistant to deterioration by the action of oxygen, ozone and oxidizing agents, comprising a cured homogeneous mixture of a chlorosulfonated normally solid polymer of ethylene and an unsaturated elastomer of the group consisting of natural rubber, isomerized rubber, polychloroprene, polymers of butadiene alone, copolymers of butadiene with acrylonitrile, copolymers of butadiene with styrene and copolymers of butadiene with iso-olefins, the chlorosulfonated normally solid polymer of ethylene constituting from about 20% to about 50% by volume of the elastomer in the composition.

7. A composition of matter, highly resistant to deterioration by the action of oxygen, ozone and oxidizing agents, comprising a cured homogeneous mixture of a chlorosulfonated normally solid polymer of ethylene and natural rubber, the chlorosulfonated normally solid polymer of ethylene constituting from about 20% to about 50% by volume of the elastomer in the composition.

8. A composition of matter, highly resistant to deterioration by the action of oxygen, ozone and oxidizing agents, comprising a cured homogeneous mixture of a chlorosulfonated normally solid polymer of ethylene and an unsaturated polychloroprene elastomer, the chlorosulfonated normally solid polymer of ethylene constituting from about 20% to about 50% by volume of the elastomer in the composition.

9. A composition of matter, highly resistant to deterioration by the action of oxygen, ozone and oxidizing agents, comprising a cured homogeneous mixture of a chlorosulfonated normally solid polymer of ethylene and an unsaturated elastomer which is a copolymer of butadiene with styrene, the chlorosulfonated normally solid polymer of ethylene constituting from about 20% to about 50% by volume of the elastomer in the composition.

10. A composition of matter, highly resistant to deterioration by the action of oxygen, ozone and oxidizing agents, comprising a cured homogeneous mixture of a chlorosulfonated normally solid polymer of ethylene and an unsaturated elastomer which is a copolymer of butadiene with acrylonitrile, the chlorosulfonated normally solid polymer of ethylene constituting from about 20% to about 50% by volume of the elastomer in the composition.

(References on following page)

References Cited in the file of this patent

UNITED STATES PATENTS

| | | |
|---|---|---|
| 2,213,423 | Wiezevich | Sept. 3, 1940 |
| 2,229,985 | Nowak et al. | Jan. 28, 1941 |
| 2,416,061 | McAlevy | Feb. 18, 1947 |
| 2,458,841 | Elmore | Jan. 11, 1949 |
| 2,465,336 | MacDonald et al. | Mar. 29, 1949 |
| 2,476,832 | Donia | July 19, 1949 |
| 2,630,398 | Brooks et al. | Mar. 3, 1953 |

OTHER REFERENCES

Emmett Ind. & Eng. Chem., August 1944, pages 729–734.

Vinylite Elastomeric Compounds Plastics Bonding, pub., 1944, Carbide & Carbon Chem. Corp., N. Y., pages 6 and 11.

Fisher: "Nomenclature of Synthetic Rubbers," The India-Rubber Journal, pages 85–89, January 27, 1940.